US007366936B2

(12) United States Patent
Usami (10) Patent No.: US 7,366,936 B2
(45) Date of Patent: Apr. 29, 2008

(54) MEMORY CONTROL DEVICE AND IMAGE FORMING DEVICE EQUIPPED WITH A SELECTION CIRCUIT SELECTIVELY APPLYING A REFERENCE CLOCK OR A MODULATED CLOCK TO A SYNCHRONOUS MEMORY AS AN EXTERNAL CLOCK BASED ON A SELECTION SIGNAL

(75) Inventor: Hajime Usami, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 421 days.

(21) Appl. No.: 10/932,140

(22) Filed: Sep. 2, 2004

(65) Prior Publication Data

US 2005/0046898 A1 Mar. 3, 2005

(30) Foreign Application Priority Data

Sep. 2, 2003 (JP) ............................. 2003-310585

(51) Int. Cl.
*G06F 13/42* (2006.01)
*G06F 12/00* (2006.01)
*G01F 1/00* (2006.01)

(52) U.S. Cl. ...................... 713/400; 713/500; 711/105
(58) Field of Classification Search ................ 713/400, 713/500, 501; 711/105, 167
See application file for complete search history.

(56) References Cited

U.S. PATENT DOCUMENTS 5,731,770 A 3/1998 Minoda 6,055,645 A * 4/2000 Noble .......................... 713/501
6,944,738 B2 * 9/2005 Dong ........................... 711/167

FOREIGN PATENT DOCUMENTS

| JP | 8-227374 A | 9/1996 |
| JP | B2 3037582 | 11/1996 |
| JP | 11039461 A * | 2/1999 |
| JP | 2000-29779 A | 1/2000 |
| JP | B2 3097688 | 8/2000 |
| JP | 2000-251464 A | 9/2000 |
| JP | A 2000-280575 | 10/2000 |
| JP | A 2001-111745 | 4/2001 |
| JP | 2001-144955 A | 5/2001 |
| JP | A 2001-134341 | 5/2001 |

* cited by examiner

*Primary Examiner*—Suresh K Suryawanshi
(74) *Attorney, Agent, or Firm*—Oliff & Berridge, PLC (57) ABSTRACT

Modulated clocks S-clk from a spread spectrum clock generator are supplied as operating clocks to an SDRAM when no control signals (ras#, cas#, cs# and we#) are output and no data is written to the SDRAM, that is before time t1, between time t3 and t4, and period after time t9. Reference clocks clk (fixed frequency clock) are supplied to the SDRAM as the operating clock when control signals are output and data is written to the SDRAM, that is during period between time t1 and t3 and between time t4 to t9. This makes it possible to reduce electromagnetic interference generated by clock signals supplied to the SDRAM while also enabling accurate control of the SDRAM.

18 Claims, 6 Drawing Sheets

MEMORY CONTROL DEVICE AND IMAGE FORMING DEVICE EQUIPPED WITH A SELECTION CIRCUIT SELECTIVELY APPLYING A REFERENCE CLOCK OR A MODULATED CLOCK TO A SYNCHRONOUS MEMORY AS AN EXTERNAL CLOCK BASED ON A SELECTION SIGNAL

BACKGROUND OF THE INVENTION

1. Field of the Invention

The present invention relates to memory control devices that control SDRAM and other synchronous memory devices as well as image forming devices equipped with such memory control devices.

2. Description of the Related Art

Recent electric devices operate with the aid of a CPU of a personal computer (hereinafter referred to as "PC") or a CPU incorporated in a printer or the like. The CPU processes and controls a variety of data. Operating frequencies of the system clock (reference clock) in the CPUs are constantly increasing to increase the processing speed. However, higher clock frequencies result in generation of greater electromagnetic interference in the electronic device. Electromagnetic interference has a negative effect on other operations in the device and on other electronic devices.

Recently, modulated clocks are used as operating clocks to suppress electromagnetic interference. Modulated clocks are generated by Spread Spectrum Clock (SSC) technology. The SSC technology modulates the reference clock to spread and fall within a narrow band such that the modulated clock periodically changes its clock frequency by a few percent. The change in clock frequency suppresses the peak of electromagnetic interference, as disclosed in Japanese patent application publication No. 2000-280575.

CPUs designed to operate in accordance with input clocks can use the modulated clocks as they are. Recently, however, input clocks are used upon multiplying the input clocks with the use of a PLL (phase locked loop) circuit built-in CPU rather than using the input clocks as they are. The use of the modulated clocks generated by the SSC technology in the PLL circuit built-in CPU may cause the PLL to unlock the PLL. As a result, clocks with a desired frequency cannot be obtained.

For this reason, a CPU with the built-in PLL circuit and circuits that exchange signals directly with the CPU are supplied with the reference clocks while other circuits are supplied with the modulated clocks. This configuration does not lower the peak of electromagnetic interference generated from reference clock lines, but lower the peak of electromagnetic noise generated from modulated clock lines. Thus overall electromagnetic interference is suppressed.

Although the use of both a reference clock and a modulated clock reduces electromagnetic interference, this approach has some disadvantages. For example, a synchronous memory that operates in synchronization with an external clock may not operate normally. There are several types of synchronous memories, such as synchronous. ROM (SROM), synchronous static RAM (SSRAM), synchronous dynamic RAM (SDRAM), etc. Due to large storage space and low cost, the SDRAMs are often used as a main memory in PCs, printers, and other electronic devices.

The SDRAMs are normally controlled by a dedicated memory control circuit. This memory control circuit outputs commands to the SDRAM based on commands that the circuit receives from the CPU. The memory control circuit is normally formed in an ASIC (Application Specific Integrated Circuit) or other integrated circuit.

Since the memory control circuit exchanges various signals and data with the CPU and is often mounted relatively close to an oscillator (i.e., the oscillator and the ASIC are located in positions close to each other on the circuit board) that generates reference clocks, the memory control circuit operates in synchronization with the reference clocks.

The SDRAM, on the other hand, is often configured as a DIMM (Dual Inline Memory Module) or similar module and is therefore often located on a portion of the circuit board that is some distance away from the CPU or ASIC.

Figure 3:
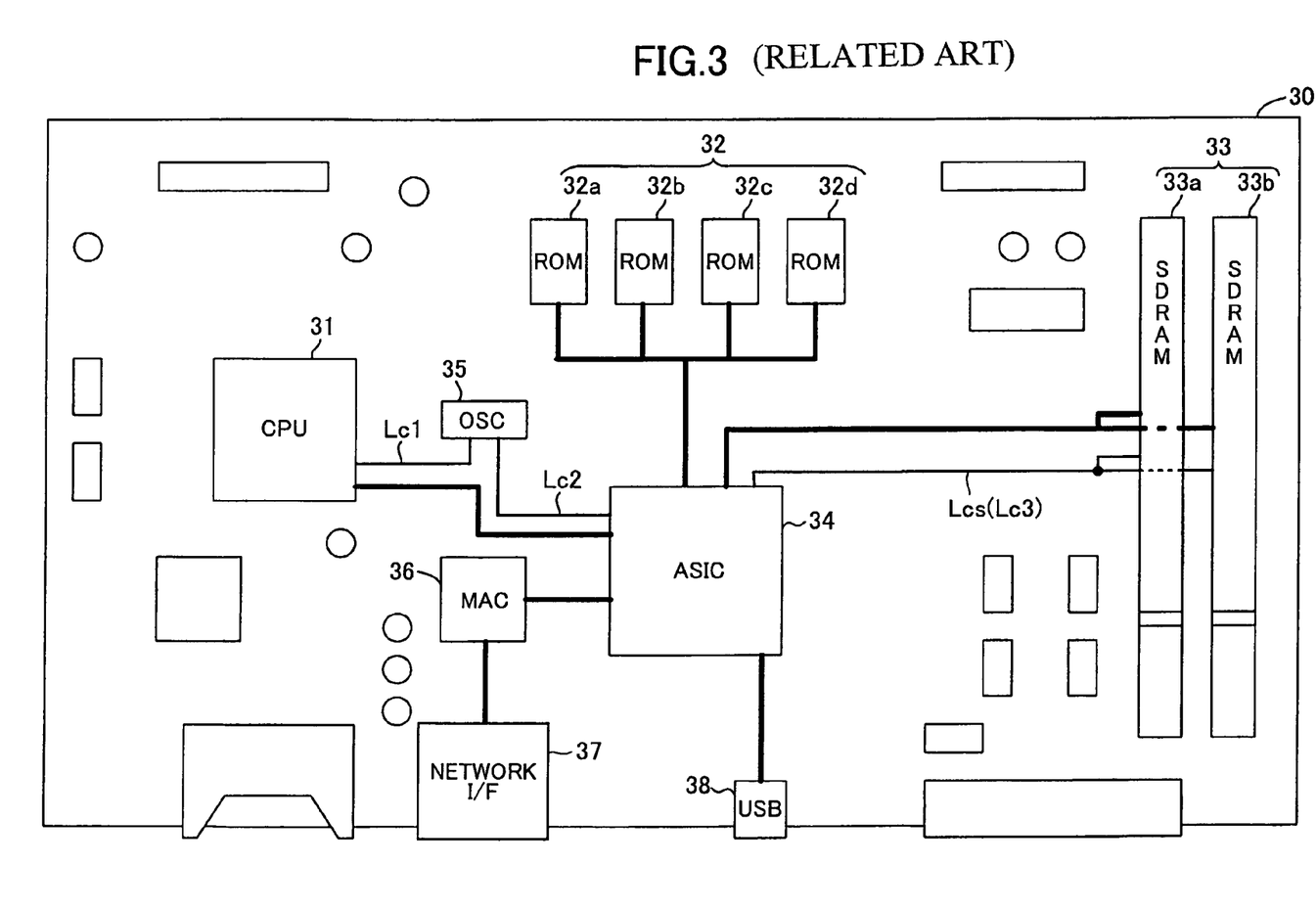
FIG. 3 is a block-diagram showing components mounted on a main substrate of the printer of FIG. 1.

As shown in FIG. 3, the length of reference clock line Lc3 from an oscillator 35 to an SDRAM 33 via an ASIC 34 is longer than the length of reference clock line Lc1 from the oscillator 35 to a CPU 31 and the length of reference clock line Lc2 from the oscillator 35 to the ASIC 34. With this configuration, a spread spectrum clock generator (SSCG) is provided in the ASIC 34 to thereby generate modulated clocks while modulating reference clocks. The modulated clocks are supplied from the ASIC 34 to the SDRAMs 33 to operate the latter in synchronization with the modulated clocks.

The memory control circuit outputs various control signals and writes and reads data to and from the SDRAM in synchronization with the reference clock while the SDRAM, that is controlled by the memory control circuit, operates in synchronization with the modulated clocks. As a result, there are risks that the control signals from the memory control circuit are not properly received, that data write/read operations do not end normally, or that the SDRAM may not operate normally.

Figure 6A:
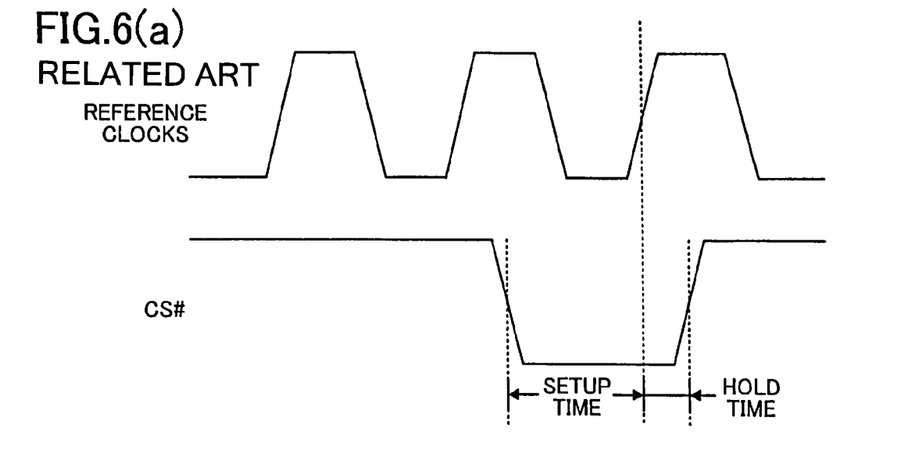
FIGS. 6(a) through 6(c) are time charts illustrating the relationship between clock and control signals in SDRAM modules.
Figure 6B:
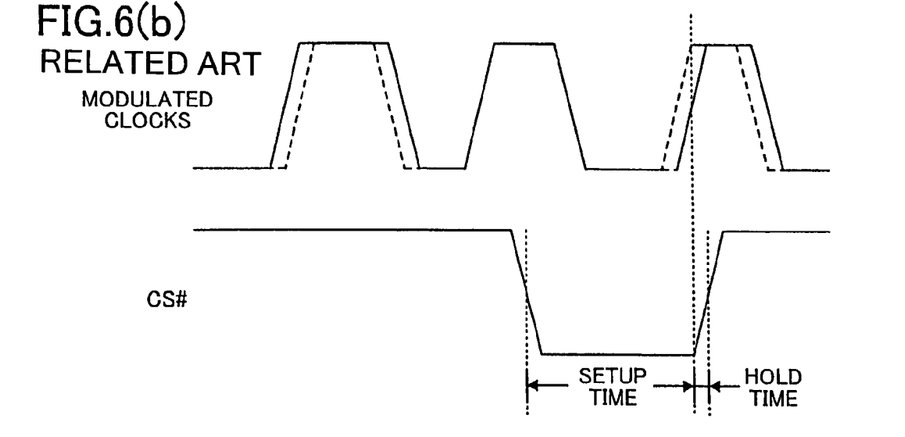
Figure 6C:
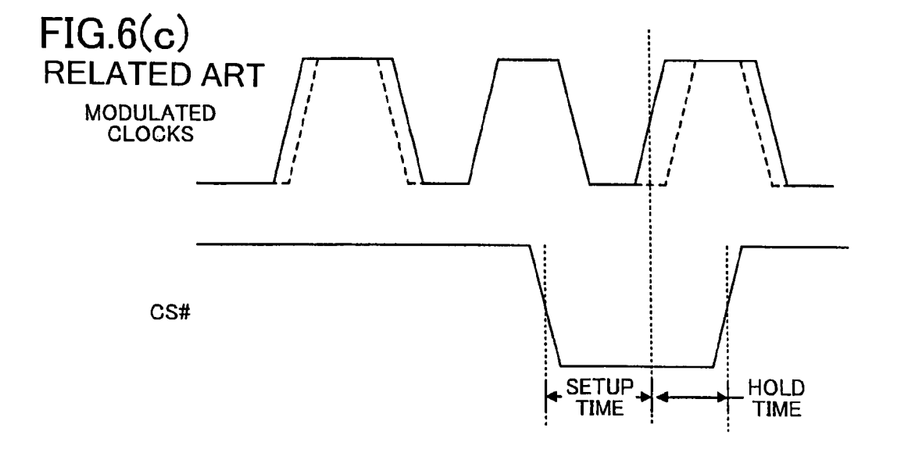

More specifically, when the SDRAM operates in synchronization with reference clocks, as shown in FIG. 6(a), there is enough setup time and hold time before a reference clock signal rises. This enables the SDRAM to latch control signals and interpret the command. Note that FIGS. 6(a) through 6(c) show only a chip select signal cs#. However, when the SDRAM operates in synchronization with modulated clocks, the hold time is reduced as shown in FIG. 6(b) or the setup time is reduced as shown in FIG. 6(c). Although there seems to be enough setup time in FIG. 6(c), a setup time longer than the hold time must be provided. For this reason, it is not desirable that the setup time become shorter than the predetermined setup time shown in FIG. 6(a).

Thus the SDRAM operating in synchronization with the modulated clocks reduces the setup or hold times. As a result, latching control signals and data by the SDRAM is not assured.

SUMMARY OF THE INVENTION

In view of the above-described drawbacks, it is an object of the present invention to provide a memory control device that is capable of accurately controlling a synchronous memory operating in synchronization with clocks, to reduce electromagnetic interference caused by the clock signal, and to provide image forming devices incorporating such a memory control device.

In order to attain the above and other objects, according to one aspect of the present invention, there is provided a memory control device for controlling a synchronous memory operable in synchronization with external clocks. The memory control device includes a memory controller that generates and applies a control command to the synchronous memory in accordance with an instruction received from a CPU, an oscillator that generates reference clocks having a predetermined frequency, a clock modulator that modulates the reference clocks to modulated clocks having a frequency varying in a predetermined frequency range into which the predetermined frequency falls, and a selection circuit that selectively applies one of the reference clocks and the modulated clocks to the synchronous memory as the external clocks. The selection circuit applies the reference clocks to the synchronous memory when the memory controller applies the control command to the synchronous memory.

According to another aspect of the present invention, there is provided a memory control device for controlling a synchronous memory operable in synchronization with external clocks. The memory controller includes a memory controller that reads data from the synchronous memory in accordance with an instruction received from a CPU, an oscillator that generates reference clocks having a predetermined frequency, a clock modulator that modulates the reference clocks to modulated clocks having a frequency varying in a predetermined frequency range into which the predetermined frequency falls, and a selection circuit that selectively applies one of the reference clocks and the modulated clocks to the synchronous memory as the external clocks. The selection circuit applies the reference clocks to the synchronous memory when the memory controller reads the data from the synchronous memory.

According to another aspect of the present invention, there is provided an image forming device including an interface that receives image data from an external device, a synchronous RAM that operates in synchronization with external clocks, the synchronous RAM storing the image data, a memory controller that writes the image data into the synchronous RAM in accordance with an instruction received from a CPU, an oscillator that generates reference clocks having a predetermined frequency, a clock modulator that modulates the reference clocks to modulated clocks having a frequency varying in a predetermined frequency range into which the predetermined frequency falls, a selection circuit that selectively applies one of the reference clocks and the modulated clocks to the synchronous RAM as the external clocks, and an image forming unit that forms images on a recording medium based on the image data. The selection circuit applies the reference clocks to the synchronous RAM when the memory controller writes the image data to the synchronous RAM.

DETAILED DESCRIPTION OF THE PREFERRED EMBODIMENT

A memory controller and a printer according to a preferred embodiment of the invention will be described while referring to the accompanying drawings.

Figure 1:
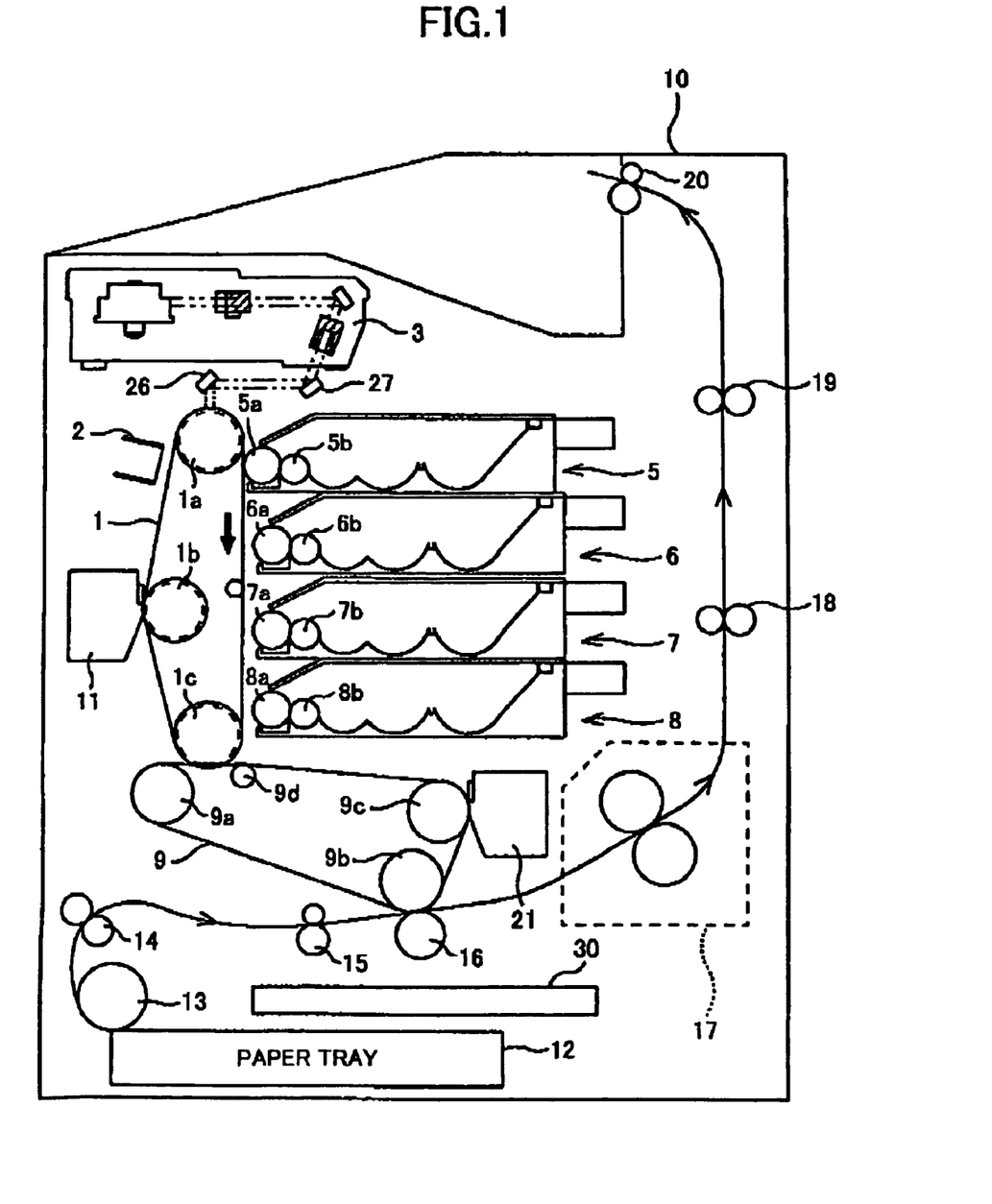
FIG. 1 is a plan view showing the overall configuration of a printer according to an embodiment of the present invention.

FIG. 1 is an explanatory drawing showing the overall configuration of a printer according to the embodiment of the invention. As shown in FIG. 1, the printer 10 includes a photosensitive belt 1, a photosensitive belt support rollers 1a-1c, a charging device 2, a laser unit 3, first to fourth developing units 5-8, an intermediate transfer belt 9, intermediate transfer belt support rollers 9a-9d, a photosensitive belt cleaning unit 11, a paper tray 12, a feed roller 13, conveying rollers 14 and 15, a transfer roller 16, a thermal fixing unit 17, discharge rollers 18-20, an intermediate transfer belt cleaning unit 21, mirrors 26 and 27, and a main substrate 30.

The photosensitive belt 1 is an endless and flexible image bearing member mounted over the photosensitive belt support rollers 1a-1c under tension. The photosensitive belt support rollers 1a-1c are rotated clockwise by a drive motor (not shown), and the rollers 1a-1c rotate the photosensitive belt 1 clockwise.

The charging device 2 is located in opposition to the photosensitive belt 1 and uniformly charges the photosensitive belt 1 that is driven to rotate around the rollers 1a-1c. The laser unit 3 includes a laser light source and a polygon mirror, and irradiates a laser beam modulated in accordance with color image data onto the photosensitive belt 1 via the mirrors 27 and 26, thereby forming electrostatic latent images on the photosensitive belt 1. The color image data is input to the printer 10 from a PC 40 (FIG. 2) to be described later.

The first to fourth developing units 5-8 are disposed at one side of the photosensitive belt 1. Each of the four developing units 5-8 includes a developing roller 5a, 6a, 7a, 8a and a supply roller 5b, 6b, 7b, 8b. Although not shown in the drawings, each of the developing units 5-8 further includes a doctor blade and an agitator. The doctor blade regulates the thickness of a toner layer on the surface of the developing roller 5a-8a to adjust the amount of toner supplied to the photosensitive belt 1. The agitator agitates the toner. The developing units 5-8 each hold a different color toner (developer), i.e., yellow, cyan, magenta and black toner. The toner supply roller 5b-8b supplies toner to the associated developing roller 5a-8a.

The intermediate transfer belt 9 is an endless, flexible image bearing member which is mounted over the intermediate transfer belt support rollers 9a, 9b, 9c, and 9d under tension. The intermediate transfer belt 9 rotates counterclockwise while contacting the photosensitive belt 1. A bias is applied to the intermediate transfer belt 9 so that toner is transferred from the photosensitive belt 1 to the intermediate transfer belt 9.

The photosensitive belt cleaning unit 11 is disposed in contact with the photosensitive belt 1 and downstream of the developing units 5-8 with respect to the direction in which the photosensitive belt 1 rotates. The cleaning unit 11 is provided to remove toner remaining on the photosensitive belt 1.

The transfer roller 16 is rotatably disposed while contacting the intermediate transfer belt 9 with a printing paper interposed therebetween. A bias is applied to the transfer roller 16 to transfer toner images to the printing paper. The paper tray 12, the feed roller 13, the conveying rollers 14 and 15 are located along a paper transportation path and upstream of the transfer roller 16. The fixing unit 17 and the discharge rollers 18-20 are located along the paper transportation path and downstream of the transfer roller 16.

The intermediate transfer belt cleaning unit 21 is disposed while contacting the intermediate transfer belt 9 and removes toner remaining on the intermediate transfer belt 9.

During operation, the photosensitive belt 1 is rotated clockwise, and the charging device 2 uniformly charges the photosensitive belt 1. Then the laser beam from the laser unit 3 is irradiated onto the photosensitive belt 1 via the mirrors 27 and 26, thereby forming an electrostatic latent image on the photosensitive belt 1. The first developing unit 5 develops the latent image with toner contained therein. Specifically, the first developing unit 5 moves toward the photosensitive belt 1 until the developing roller 5a is brought into contact with the photosensitive belt 1. The rotating developing roller 5a conveys the toner to the surface of the photosensitive belt 1, thereby developing the electrostatic latent image on the photosensitive belt 1 and forming a toner image thereon. The toner image thus formed on the photosensitive belt 1 is moved downward and transferred to the intermediate transfer belt 9.

When the development of the latent image by the first developing unit 5 ends, the toner remaining on the photosensitive belt 1 is removed by the photosensitive belt cleaning unit 11. Then the charging device 2 charges the photosensitive belt 1, and the laser unit 3 forms on the photosensitive belt 1 an electrostatic latent image according to the color image data that the second developing unit 6 will develop.

Next, the first developing unit 5 moves away from the photosensitive belt 1 while the second developing unit 6 moves toward the photosensitive belt 1 and the associated developing roller 6a is brought into contact with the photosensitive belt 1. Thus the electrostatic latent image on the photosensitive belt 1 is developed by the toner in the second developing unit 6. Next, the toner on the photosensitive belt 1 is transferred to the intermediate transfer belt 9.

In the same manner, the developing roller 7a of the third developing unit 7 and the developing roller 8a of the fourth developing unit 8 consecutively contact the photosensitive belt 1 to develop the latent images with the toner from the developing units 7 and 8. After each development, the toner images are transferred to the intermediate transfer belt 9 after which the photosensitive belt cleaning unit 11 removes any toner still remaining on the photosensitive belt 1.

When the development by the developing units 5-8 and transfer of the toner images to the intermediate transfer belt 9 are completed, a full color toner image is formed on the intermediate transfer belt 9. A bias is then applied to the transfer roller 16 to transfer the toner image to the printing paper fed from the paper tray 12 via the feed roller 13 and the conveying rollers 14 and 15. After the transferred toner image is fixed by the fixing unit 17, the discharge rollers 18-20 guide the printing paper out of the printer 10. After the image has been transferred to the printing paper, the intermediate transfer belt cleaning unit 21 removes the toner remaining on the intermediate transfer belt 9.

Figure 2:
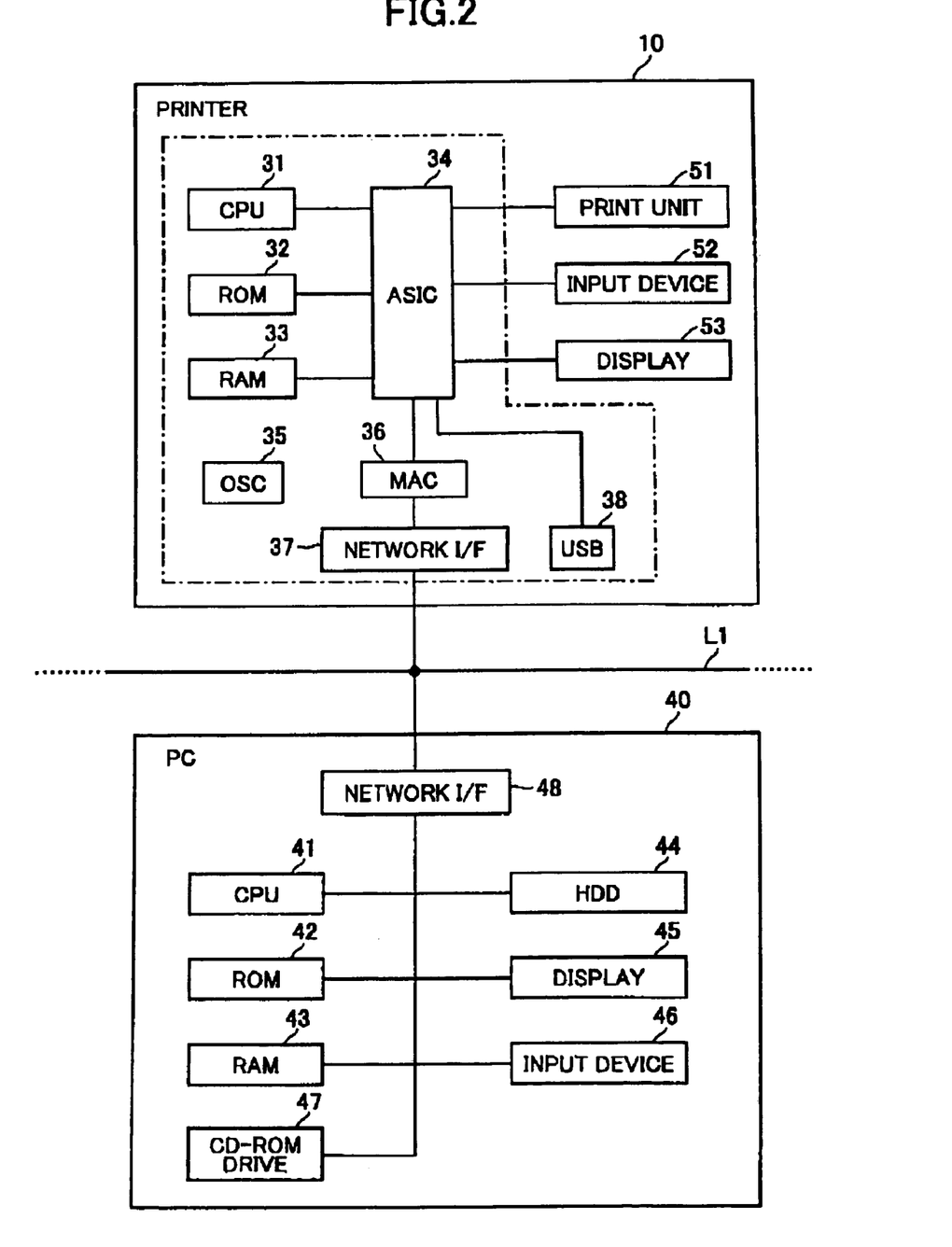
FIG. 2 is a block-diagram showing the overall configuration of a network printing system according to the embodiment of the present invention.

Next, a network printing system according to the embodiment of the invention will be described while referring to FIG. 2. FIG. 2 is an explanatory diagram showing the overall configuration of the network printing system. The network printing system includes the printer 10 and the PC 40 that are interconnected via a network transmission line L1. Color image data is applied to the printer 10 from the PC 40, and the printer 10 prints a color image on a printing paper based on the color image data supplied from the PC 40.

The printer 10 includes a CPU 31, a ROM 32, a RAM 33, and an ASIC 34. The CPU 31 governs the entire operation of the printer 10. The ROM 32 stores parameters and programs to be executed by the CPU 31. The RAM 33 stores color image data and other data transferred from the PC 40 and is used as a temporary work area of the CPU 31. The ASIC 34 outputs control signals to the units connected thereto (other than the CPU 31 and the ASIC 34) based on commands received from the CPU 31.

The printer 10 further includes an oscillator 35, a MAC chip 36, a network interface 37, a USB terminal 38, a print unit 51, an input device 52, and a display 53. The oscillator 35 generates reference clocks for synchronization of the components contained in the printer 10. The MAC chip 36 processes data, such as MAC addresses, contained in MAC (Media Access Control) frames input or output via the network transmission line L1. The network interface 37 transmits data between the printer 10 and other external components. The USB terminal 38 is a data input/output port in compliance with a USB (Universal Serial Bus) standard. The print unit 51 prints out color images on the printing paper based on externally input color image data.

More specifically, the print unit 51 includes the laser unit 3, the photosensitive belt 1, the developing units 5-8, the intermediate transfer belt 9, the fixing unit 17, and other components in the printer 10 shown in FIG. 1 as well as an engine substrate (not shown) that outputs control and drive signals to these components of the print unit 15 according to control signals output from the ASIC 34.

The input device 52 allows the user to effect various settings of the printer 10. The display 53 visibly indicates the result of settings entered through the input device 52, printer status information, and other information on printer operation.

The components encircled by a dot-and-dash line in FIG. 2, that is, the CPU 31, the ROM 32, the RAM 33, the ASIC 34, the oscillator 35, the MAC chip 36, the network interface 37, and the USB terminal 38 are, as shown in FIG. 3, mounted on the main substrate 30. The ROM 32 is made up of a plurality of ROM chips (four ROM chips 32a, 32b, 32c, and 32d, in this example). In this embodiment, an SDRAM is used as the RAM 33. More specifically, an SDRAM module (DIMM) is used as the RAM 33, on which a plurality of SDRAM chips 33a and 33b are mounted.

As described hereinabove, the oscillator 35 and the CPU 31 are connected with the reference clock supply line Lc1 while the oscillator 35 and the ASIC 34 are connected with the reference clock supply line Lc2. Also, in this embodiment, the ASIC 34 and the SDRAM 33 are connected with a memory clock line Lcs (Lc3). The SDRAM 33 is supplied with either the reference clocks or modulated clocks.

Referring back to FIG. 2, the PC 40 is an ordinary PC provided with a CPU 41, a ROM 42, a RAM 43, a hard disk (HDD) 44, an LCD display 45, a keyboard or other input device 46, a CD-ROM drive 47, and a network interface 48. Document data, color image data, and other print data generated using applications installed on the PC 40 can be output in response to print commands to the printer 10 via the network interface 48 and the network transmission line L1. The print unit 51 converts the print data input via the network transmission line L1 to printable data, which is then printed by the printer 10.

Figure 4:
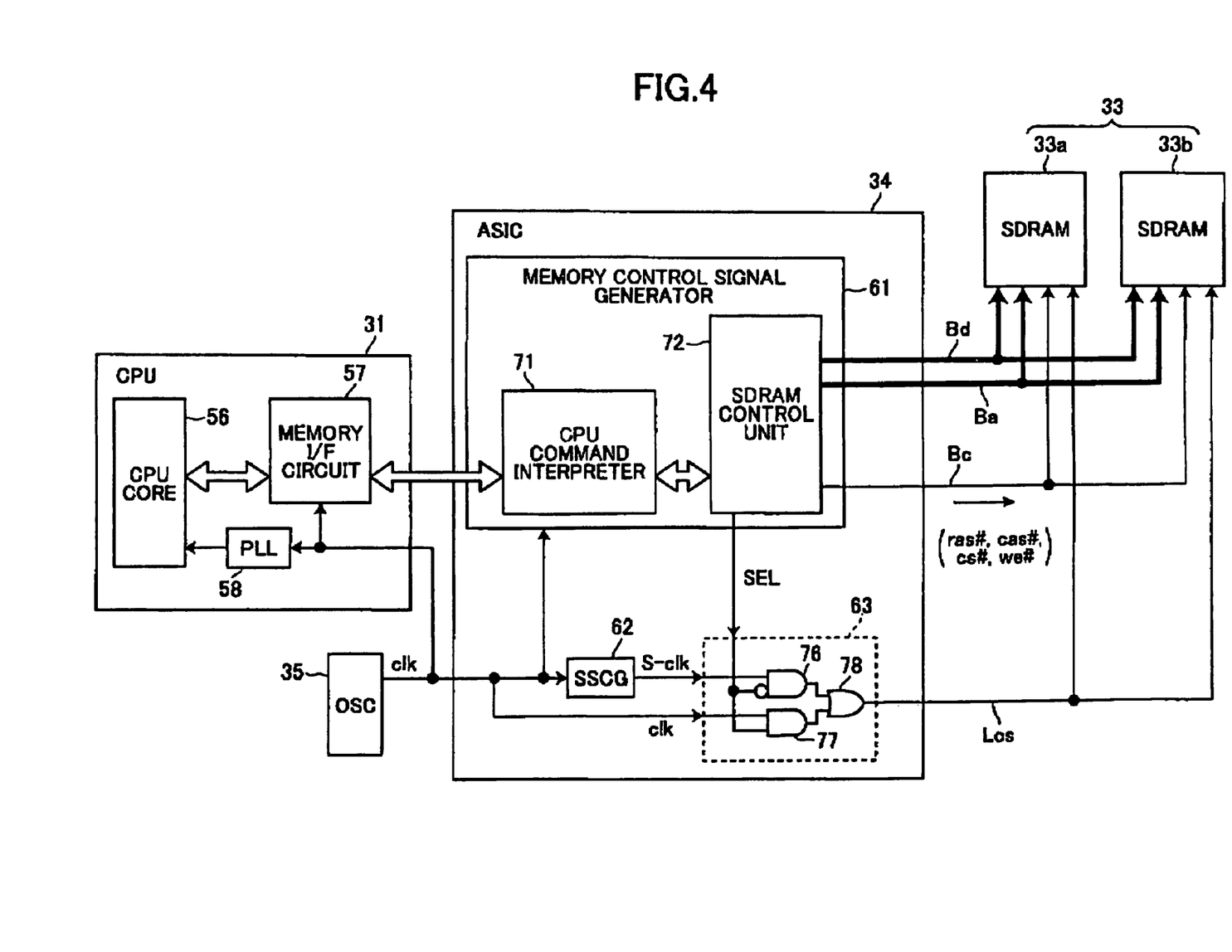
FIG. 4 is a block-diagram showing the overall configuration of an SDRAM control system according to the embodiment of the present invention.

Next, an SDRAM control system in the printer 10 will be described with reference to FIG. 4. FIG. 4 is an explanatory diagram showing the overall configuration of the SDRAM control system in the printer 10.

The SDRAM control system of the printer 10 includes the CPU 31, the ASIC 34, the SDRAM 33, and the oscillator 35. The oscillator 35 is a well-known clock generator that generates reference clocks clk with a constant frequency (100 MHz in this embodiment). The reference clocks clk generated by the oscillator 35 are input to the CPU 31 and the ASIC 34.

The CPU 31 is provided with a CPU core 56, a memory interface (I/F) circuit 57, and a PLL circuit 58. The CPU core 56 executes various processes based on programs stored in the ROM 32. The memory interface circuit 57 operates as an interface for the various data and control signals that are transferred between a memory control signal generator 61 in the ASIC 34 and the CPU core 56. The PLL circuit 56 multiplies (for example to 1 GHz) the reference clocks clk input from the oscillator 35. While the CPU 31 uses the reference clocks clk as the operating clocks, the CPU core 56 actually uses the high-frequency clocks that are multiplied by the PLL circuit 58 as the operating clock.

The ASIC 34 is provided with the memory control signal generator 61, a spread spectrum clock generator (SSCG) 62, and a selection circuit 63. The memory control signal generator 61 generates a selection signal SEL to be applied to the selection circuit 63 and control signals to be applied to the SDRAM 33. The SSCG 62 uses SSC to modulate the reference clocks clk input from the oscillator 35 to generate modulated clocks S-clk. The selection circuit 63 selects either the reference clocks clk or the modulated clocks S-clk based on the selection signal SEL from the memory control signal generator 61.

The SSCG 62 modulates the reference clocks clk (100 MHz) within a narrow band to generate modulated clocks S-clk that change periodically within a range from 99 to 101 MHz. The change in the frequency of the modulated clocks S-clock could be either continuous or non-contiguous (frequency hopping). The modulated clocks S-clk and the reference clocks clk are applied to the selection circuit 63. The selection circuit 63 is made up of three gate circuits 76, 77 and 78. The modulated clocks S-clk are applied to a first input of the AND gate 76, and the selection signal SEL is applied to a second input of the AND gate 76 to which an inverter is connected. The reference clocks clk are applied to a first input of the AND gate 77, and the selection signal SEL is applied to a second input of the AND gate 77 also. The outputs from the AND gates 76 and 77 are applied to the OR gate 79.

When the selection signal SEL generated from the memory control signal generator 61 is LOW, the AND gate 77 is disabled. On the other hand, the AND gate 76 is enabled. As a result, the OR gate 78 allows the modulated clocks S-clk to pass therethrough. Thus the modulated clocks S-clk are supplied to the SDRAM 33 via the memory clock line Lcs. When the selection signal SEL goes HIGH, the AND gate 76 is disabled whereas the AND gate 77 is enabled. As a result, the gate circuit 78 allows the reference clocks clk to pass therethrough. Thus the reference clocks clk are supplied to the SDRAM 33 via the memory clock line Lcs.

The memory control signal generator 61 outputs control signals and address signals to the SDRAM 33 according to control signals fed from the CPU 31. The memory control signal generator 61 also outputs predetermined control signals to the CPU 31 as required. The SDRAM 33 operates according to the control signals and address signals fed from the memory control signal generator 61. The memory control signal generator 61 is also designed to relay data between the CPU 31 and the SDRAM 33. To transfer control signals to the SDRAM 33, the memory control signal generator 61 and the SDRAM 33 are connected by a control bus Bc to transfer control signals, an address bus Ba to transfer address signals, and a data bus Bd to transfer data to the SDRAM 33.

The memory control signal generator 61 includes a CPU command interpreter 71 and an SDRAM control unit 72. The CPU command interpreter 71 decodes the control signals from the CPU 31 and determines whether these signals are control signals or data for the SDRAM 33. The contents of the control signals intended for the SDRAM control are transferred to the SDRAM control unit 72, The SDRAM control unit 72 generates the control signals and the address signals for controlling the SDRAM 33 according to the content of the CPU 31 commands and outputs the resulting signals to the SDRAM 33. The SDRAM 33 interprets the commands based on the control signals and reads (or writes) data based on command content and the assigned address.

The SDRAM control unit 72 also outputs the selection signal SEL to the selection circuit 63. More specifically, when the SDRAM control unit 72 outputs the control signals to the SDRAM 33, reads data from the SDRAM 33 or writes data into the SDRAM 33 (hereinafter referred to as "control and data access period"), the SDRAM control unit 72 outputs the HIGH selection signal SEL. Other than the control and data access period, the SDRAM control unit 72 outputs a LOW selection signal SEL. Thus the reference clocks clk are supplied to the SDRAM 33 during the control and data access period while the modulated clocks S-clk are supplied to the SDRAM 33 at times other than the control and data access period.

An overview of the SDRAM 33 operation will be given below. As stated above, various control signals from the SDRAM control unit 72 are applied to the SDRAM 33. These control signals include a chip selector signal (cs#), a row address strobe signal (ras#), a column address strobe signal (cas#), and a write enable signal (we#). The SDRAM control unit 72 uses a combination of cs#, ras#, cas# and we# control signals to designate a command to the SDRAM 33. The symbol "#" appended to the signal name indicates negative logic (active row).

These commands can set a burst length (BL), a CAS latency (CL), and other SDRAM 33 operation modes. The burst length indicates the number of bits in a continuous data output (or input) in burst mode. The CAS latency indicates the number of clock cycles (see FIG. 5) from the input of a read command until start of a data read operation.

The SDRAM 33 latches the cs#, ras#, cas#, and we# signals and interprets the command in coincidence with the rising edge of the clock signal (reference clocks clk during the control and data access period) fed from the memory clock line Lcs. An active command, a read command, a write command, a precharge command, and a mode register setting command are examples of typical commands. The active command is a command when both cs# and ras# are LOW and both cas# and we# are HIGH. The read command is a command when both cs# and cas# are LOW and other control signals are HIGH. The write command is a command when cs#, cas# and we# are LOW and ras# is HIGH. The precharge command is a command when cs#, ras#, and we# are LOW and cas# is HIGH. The mode register setting command is the command when control signals cs#, ras#, cas# and we# are all LOW. The above burst length and CAS latency are specified when the address signal is set to a predetermined logic level when the mode register setting command is output. Description of commands other than those described above is omitted herein since the commands including the above described commands are all well-known SDRAM control commands.

Figure 5:
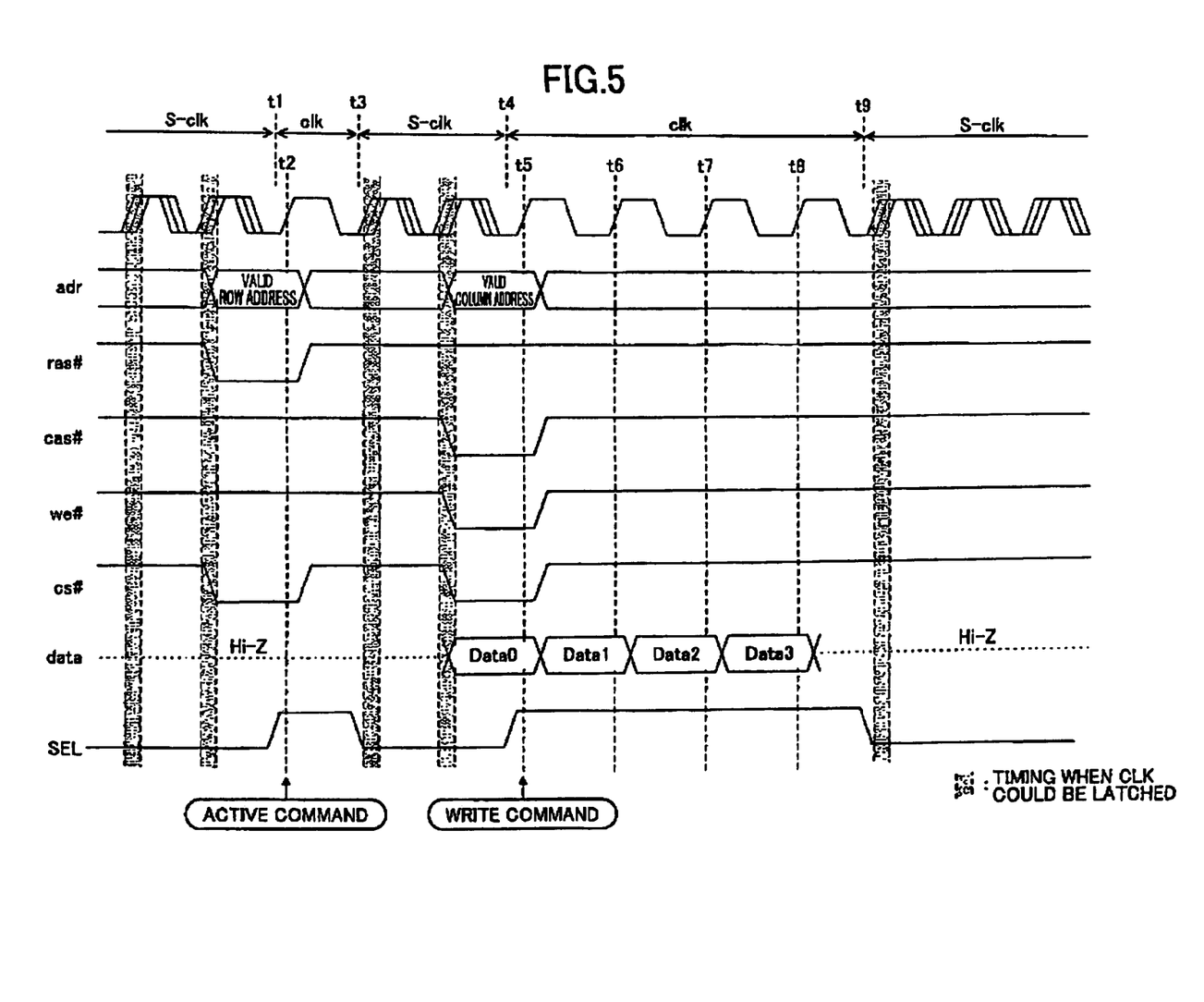
FIG. 5 is a time chart showing an example of control during a write operation.

A detailed control example of the SDRAM 33 in the above-described SDRAM control system will be described with reference to FIG. 5. FIG. 5 is a time chart showing a example of control when writing data to the SDRAM 33 (write operation).

The burst length of write operation shown in FIG. 5 is four (BL=4). No control signals are input to the SDRAM 33 from the SDRAM control unit 72 until time t1, and any signals input earlier are ignored since no control signals are latched by the SDRAM 33 during this period. The SDRAM control unit 72 outputs a low selection signal SEL to the selection circuit 63 during this period. As a result, the modulated clocks S-clk are supplied to the SDRAM 33.

When ras# and cs# go LOW and the active command is input, the SDRAM control unit 72 outputs at time t1 a HIGH selection signal SEL to the selection circuit 63 so as to latch the active command. As a result, a reference clock clk is supplied to the SDRAM 33. Thus control signals are latched at time t2 when the reference clock clk rises. At the same time, the address data (row address of memory cell to which data is to be written) in the address bus Ba is latched as a valid row address.

The change to the reference clock clk at time t1 enables the SDRAM 33 to recognize input of the active command and to obtain the row address of the write operation. After the active command is latched, the SDRAM control unit 72 again outputs a LOW selection signal SEL at time t3. The modulated clocks S-clk are then supplied to the SDRAM 33.

No control signals are input to the SDRAM 33 from the SDRAM control unit 72 between time t3 and time t4, and any signals input during this period earlier are ignored since no control signals are latched by the SDRAM 33 during this period. When cas#, cs#, and we# go LOW after time t3, the write command is input to the SDRAM 33. To latch this command, the SDRAM control unit 72 outputs a HIGH selection signal SEL to the selection circuit 63 at time t4. As a result, a reference clock clk is supplied to the SDRAM 33. Thus control signals are latched at time t5 when the reference clock clk rises. At the same time, the address data (column address of memory cell to which data is to be written) in the address bus Ba is latched as a valid column address.

In addition, four data items Data 0, Data 1, Data 2, and Data 3 that are to be written to the SDRAM 33 are burst transferred in synchronization with the reference clocks clk. Data 0 through Data 3 are then sequentially latched in synchronization with the reference clocks clk in the SDRAM 33 and written to the predetermined memory cells. More specifically, Data 0 is latched at time t5, Data 1 at time t6, Data 2 at time t7, and Data 3 at time t8.

The latching of these data items and obtaining the write command at time t5 are performed in synchronization with the reference clocks clk by changing the clock signal to the reference clocks clk at time t4. When write Data 0 through Data 3 have been latched, the SDRAM control unit 72 again sets the selection signal SEL to LOW. This starts the supply of the modulated clocks S-clk to the SDRAM 33.

Like during the write operation described with reference to FIG. 5, in read operations in which data is read from the SDRAM 33, the clocks supplied to the SDRAM 33 can be switched to the reference clocks clk during the control and data access period.

In the printer 10 according to the embodiment described above, the SDRAM 33 operates in synchronization with the reference clocks clk during the control and data access period. This makes it possible to latch command signals, to interpret the commands, and to perform processes based on these commands. Read and write operations are also made possible. For example, the SDRAM 33 can output requested data in synchronization with the reference clocks clk. As a result, the data can be obtained by the memory control signal generator 61 that operates in synchronization with the same reference clocks clk. Thus, supplying the modulated clocks s-clock to the SDRAM 33 at times other than the control and data access period does not cause the above-described problem of insufficient setup time and hold time.

The modulated clocks S-clk are supplied at times other than the control and data access period. As a result, electromagnetic interference is lower during such periods than when the reference clocks clk are provided. Thus the electromagnetic interference caused when the reference clocks clk are supplied to the SDRAM 33 can be reduced and, it is possible to provide the printer 10 whose SDRAM 33 can be accurately controlled.

Since the printer 10 according to this embodiment is a color printer capable of forming color images based the on color image data, the printer 10 requires an SDRAM 33 with a large amount of storage capacity. This increases the number of control signals output from the SDRAM control unit 72 and the volume of read and write operations based on control signals. However, as described above, the printer 10 according the present embodiment operates the SDRAM in synchronization with the reference clocks clk during control and data access period. This makes it possible to reduce electromagnetic interference, enabling accurate control of a large amount of color image data and highly accurate printing of color images.

Because the SDRAM 33 provides higher volume at lower cost than many other types of synchronous memory, the use of the memory control system of this embodiment with the SDRAM will ensure more effective memory performance.

While the invention has been described in detail with reference to the specific embodiment thereof, it would be apparent to those skilled in the art that various changes and modifications may be made therein without departing from the spirit of the invention. For example, in the above-described embodiment, the clock signals to the SDRAM 33 change from the modulated clocks S-clk to the reference clocks clk during control and data access period (which, like in FIG. 5, is strictly defined as a predetermined time period such as when control and signal data are latched on the rising edge of the clock). However, the invention is not limited to this configuration. For example, the reference clocks clk could be supplied to the SDRAM 33 only while control signals are being output. Alternatively, the reference clocks clk could be supplied only when data is been read or written.

Conversely, the reference clocks clk could be supplied to the SDRAM 33 not only during the control and data access period, but also, for example, cover the time from when the output of control signals starts until when data output (or input) ends. Thus the reference clocks clk would be used also at times other than during the control and data access period. More specifically, in FIG. 5, the period in which the reference clocks clk are supplied could be extended to include time t3 so that the reference clock clk would be supplied from time t1 to time t9. However, electromagnetic interference considerations make it desirable to supply the reference clocks clk only during the control and data access period as in the above-described embodiment.

Also the reference clocks clk are used during the control and data access period in the above-described embodiment to solve the setup time and hold time problem of the modulated clocks S-clk. However, instead of supplying the reference clocks clk, it would be possible to narrow the frequency band used by the modulated clocks S-clk.

That is, the frequency band of the modulated clock S-clk in the above-described embodiment is 99 to 101 MHz. The problem frequencies in latching control signals and data in the SDRAM 33 is, for example, the frequencies in the range between 99 to 99.5 MHz or the frequencies between 100.5 to 101 MHz. Thus applying the modulation to a comparatively narrow frequency band, say 99.5 to 100.5 MHz would not affect the SDRAM 33 operation. Switching the frequency band of the modulated clocks S-clk during control and data access period to 99.5 to 100.5 MHz would solve the setup time and hold time problem during modulated clock cycles.

Thus changing the frequency band (to a narrower band) of the modulated clocks S-clk during control and data access period also makes it possible, like in the above-described embodiment, to accurately control the SDRAM 33. In addition, although the frequency band is narrower, the SDRAM 33 is supplied with the modulated clocks S-clk at all times, which makes for a greater reduction in electromagnetic interference than in the above-described embodiment.

An SDRAM is used in the above-described embodiment. However, for example, Rambus (registered trademark) R-DRAM or similar type DRAM could be used instead. Many other is types of synchronous memory could be used instead of DRAM. For example, synchronous SRAM (SS-RAM) used as cache memory or synchronous RAM (SROM) are examples of other types of memory that could be used.

What is claimed is:

1. A memory control device for controlling a synchronous memory operable in synchronization with external clocks, the memory control device comprising:
   a memory controller that generates and applies a control command to the synchronous memory in accordance with an instruction received from a CPU, and generates a selection signal;
   an oscillator that generates reference clocks having a predetermined frequency;
   a clock modulator that modulates the reference clocks to modulated clocks having a frequency varying in a predetermined frequency range into which the predetermined frequency falls; and
   a selection circuit that selectively applies, based on the selection signal, one of the reference clocks and the modulated clocks to the synchronous memory as the external clocks,
   wherein the selection circuit applies the reference clocks to the synchronous memory when the memory controller applies the control command to the synchronous memory.

2. The memory control device according to claim 1, further comprising a CPU that outputs the instruction to the memory controller, wherein the oscillator applies the reference clocks to the CPU, and the CPU uses the reference clocks as operating clocks.

3. The memory control device according to claim 1, wherein the selection circuit applies the reference clocks to the synchronous memory when the synchronous memory latches the control command that is being applied from the memory controller.

4. A memory control device for controlling a synchronous memory operable in synchronization with external clocks, the memory controller comprising:
   a memory controller that reads data from the synchronous memory in accordance with an instruction received from a CPU, and generates a selection signal;
   an oscillator that generates reference clocks having a predetermined frequency;
   a clock modulator that modulates the reference clocks to modulated clocks having a frequency varying in a predetermined frequency range into which the predetermined frequency falls; and
   a selection circuit that selectively applies, based on the selection signal, one of the reference clocks and the modulated clocks to the synchronous memory as the external clocks,
   wherein the selection circuit applies the reference clocks to the synchronous memory when the memory controller reads the data from the synchronous memory.

5. The memory control device according to claim 4, wherein the memory controller further generates and applies a control command to the synchronous memory in accordance with an instruction received from the CPU, and the selection circuit applies the reference clocks to the synchronous memory when the memory controller applies the control command to the synchronous memory.

6. The memory control device according to claim 5, wherein the selection circuit applies the reference clocks to the synchronous memory when the synchronous memory latches the control command that is being applied from the memory controller.

7. The memory control device according to claim 4, wherein the memory controller further writes data into the synchronous memory in accordance with an instruction from the CPU, and the selection circuit applies the reference clocks to the synchronous memory when the memory controller writes the data to the synchronous memory.

8. The memory control device according to claim 4, further comprising a CPU that outputs the instruction to the memory controller, wherein the oscillator applies the reference clocks to the CPU, and the CPU uses the reference clocks as operating clocks.

9. An image forming device comprising:
   an interface that receives image data from an external device;
   a synchronous RAM that operates in synchronization with external clocks, the synchronous RAM storing the image data:
   a memory controller that writes the image data into the synchronous RAM in accordance with an instruction received from a CPU, and generates a selection signal;
   an oscillator that generates reference clocks having a predetermined frequency;
   a clock modulator that modulates the reference clocks to modulated clocks having a frequency varying in a predetermined frequency range into which the predetermined frequency falls;
   a selection circuit that selectively applies, based on the selection signal, one of the reference clocks and the modulated clocks to the synchronous RAM as the external clocks; and
   an image forming unit that forms images on a recording medium based on the image data,
   wherein the selection circuit applies the reference clocks to the synchronous RAM when the memory controller writes the image data to the synchronous RAM.

10. The image forming device according to claim 9, wherein the memory controller reads data from the synchronous RAM in accordance with an instruction from the CPU, and the selection circuit applies the reference clocks to the synchronous RAM when the memory controller reads the data from the synchronous RAM.

11. The image forming device according to claim 9, wherein the synchronous RAM is a synchronous DRAM.

12. The image forming device according to claim 9, wherein the image data is color image data.

13. The memory control device according to claim 1, wherein the selection circuit selectively applies one of the reference clocks and the modulated clocks in a first period of time to the synchronous memory as the external clocks, and applies the other of the reference clocks and the modulated clocks to the synchronous memory at times other than the first period of time.

14. The memory control device according to claim 4, wherein the selection circuit selectively applies one of the reference clocks and the modulated clocks in a first period of time to the synchronous memory as the external clocks, and applies the other of the reference clocks and the modulated clocks to the synchronous memory at times other than the first period of time.

15. The image forming device according to claim 9, wherein the selection circuit selectively applies one of the reference clocks and the modulated clocks in a first period of time to the synchronous RAM as the external clocks, and applies the other of the reference clocks and the modulated clocks to the synchronous RAM at times other than the first period of time.

16. The memory control device according to claim 1, wherein the selection circuit selectively applies one of the reference clocks and the modulated clocks in such a fashion that a setup time is provided that is always longer than a hold time before a reference clock signal rises.

17. The memory control device according to claim 4, wherein the selection circuit selectively applies one of the reference clocks and the modulated clocks in such a fashion that a setup time is provided that is always longer than a hold time before a reference clock signal rises.

18. The image forming device according to claim 9, wherein the selection circuit selectively applies one of the reference clocks and the modulated clocks in such a fashion that a setup time is provided that is always longer than a hold time before a reference clock signal rises.

* * * * *